United States Patent
Lin

(10) Patent No.: US 7,979,737 B2
(45) Date of Patent: Jul. 12, 2011

(54) METHOD FOR ACCESSING A FLASH MEMORY, AND ASSOCIATED MEMORY DEVICE AND CONTROLLER THEREOF

(75) Inventor: Jen-Wen Lin, Kaohsiung (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 234 days.

(21) Appl. No.: 12/356,544

(22) Filed: Jan. 21, 2009

(65) Prior Publication Data

US 2010/0115325 A1 May 6, 2010

(30) Foreign Application Priority Data

Oct. 30, 2008 (TW) .............................. 97141741 A

(51) Int. Cl.
*G06F 11/00* (2006.01)
(52) U.S. Cl. ..................................................... 714/6.13
(58) Field of Classification Search .................... 714/7, 8
See application file for complete search history.

(56) References Cited

U.S. PATENT DOCUMENTS

| | | | | |
|---|---|---|---|---|
| 5,602,987 A | * | 2/1997 | Harari et al. | 714/8 |
| 5,974,564 A | * | 10/1999 | Jeddeloh | 714/8 |
| 6,260,156 B1 | * | 7/2001 | Garvin et al. | 714/8 |
| 7,012,835 B2 | * | 3/2006 | Gonzalez et al. | 365/185.11 |
| 7,055,054 B2 | * | 5/2006 | Olarig | 714/5 |
| 2005/0204187 A1 | * | 9/2005 | Lee et al. | 714/8 |
| 2005/0289389 A1 | * | 12/2005 | Yamagami et al. | 714/8 |
| 2009/0319825 A1 | * | 12/2009 | Yang et al. | 714/5 |
| 2010/0058109 A1 | * | 3/2010 | Chang et al. | 714/8 |
| 2010/0058119 A1 | * | 3/2010 | Reid | 714/49 |
| 2010/0122148 A1 | * | 5/2010 | Flynn et al. | 714/773 |
| 2010/0162081 A1 | * | 6/2010 | Joo | 714/763 |
| 2010/0332894 A1 | * | 12/2010 | Bowers et al. | 714/8 |
| 2011/0099418 A1 | * | 4/2011 | Chen | 714/6.24 |

* cited by examiner

*Primary Examiner* — Marc Duncan
(74) *Attorney, Agent, or Firm* — Winston Hsu; Scott Margo

(57) ABSTRACT

A method for accessing a Flash memory including a plurality of blocks includes: selectively programming a page in a first block of the blocks; when a status of the Flash memory is abnormal, determining whether a number of error bits is less than a predetermined value; and when the number of error bits is not less than the predetermined value, moving the first block. An associated memory device and a controller thereof are also provided, where the controller includes: a read only memory (ROM) arranged to store a program code; and a microprocessor arranged to execute the program code to control the access to the Flash memory. In addition, when the number of error bits is not less than the predetermined value, the controller that executes the program code by utilizing the microprocessor moves the first block.

15 Claims, 3 Drawing Sheets

METHOD FOR ACCESSING A FLASH MEMORY, AND ASSOCIATED MEMORY DEVICE AND CONTROLLER THEREOF

BACKGROUND OF THE INVENTION

1. Field of the Invention

The present invention relates to access to a Flash memory, and more particularly, to a method for accessing a Flash memory, and to an associated memory device and a controller thereof.

2. Description of the Prior Art

As technologies of Flash memories progress in recent years, many kinds of portable memory devices, such as memory cards respectively complying with SD/MMC, CF, MS, and XD standards, are widely implemented in various applications. Therefore, the control of access to Flash memories in these portable memory devices has become an important issue.

Taking NAND Flash memories as an example, they can mainly be divided into two types, i.e. Single Level Cell (SLC) Flash memories and Multiple Level Cell (MLC) Flash memories. Each transistor that is considered a memory cell in SLC Flash memories only has two charge levels that respectively represent a logical value 0 and a logical value 1. In addition, the storage capability of each transistor that is considered a memory cell in MLC Flash memories can be fully utilized. More specifically, the voltage for driving memory cells in the MLC Flash memories is typically higher than that in the SLC Flash memories, and different voltage levels can be applied to the memory cells in the MLC Flash memories in order to record information of two bits (e.g. binary values 00, 01, 11, or 10) in a transistor that is considered a memory cell. Theoretically, the storage density of the MLC Flash memories may reach twice the storage density of the SLC Flash memories, which is considered good news for NAND Flash memory manufacturers who encountered a bottleneck of NAND Flash technologies.

As MLC Flash memories are cheaper than SLC Flash memories, and are capable of providing higher capacity than SLC Flash memories while the space is limited, MLC Flash memories have been a main stream for implementation of most portable memory devices on the market. However, various problems of the MLC Flash memories have arisen due to their unstable characteristics. For example, according to the related art, user data will get lost at any time in a situation where the quality of a Flash memory degrades due to long-term use. Thus, a novel method is required for enhancing the control of data access in such a situation where the quality of a Flash memory degrades due to long-term use, in order to guarantee the completeness of user data.

SUMMARY OF THE INVENTION

It is therefore an objective of the claimed invention to provide a method for accessing a Flash memory, and to provide an associated memory device and a controller thereof, in order to solve the above-mentioned problems.

It is another objective of the claimed invention to provide a method for accessing a Flash memory, and to provide an associated memory device and a controller thereof, in order to prevent user data from being lost in a situation where the quality of the Flash memory degrades due to long-term use.

It is another objective of the claimed invention to provide a method for accessing a Flash memory, and to provide an associated memory device and a controller thereof, in order to maintain the performance of data access in a situation where the quality of the Flash memory degrades due to long-term use.

According to a preferred embodiment of the claimed invention, a method for accessing a Flash memory comprising a plurality of blocks comprises: selectively programming a page in a first block of the blocks; when a status of the Flash memory is abnormal, determining whether a number of error bits is less than a predetermined value; and when the number of error bits is not less than the predetermined value, moving the first block.

While the method mentioned above is disclosed, an associated memory device is further provided. The memory device comprises: a Flash memory comprising a plurality of blocks; and a controller for accessing the Flash memory, wherein the controller selectively programs a page in a first block of the blocks. When a status of the Flash memory is abnormal, the controller determines whether a number of error bits is less than a predetermined value. In addition, when the number of error bits is not less than the predetermined value, the controller moves the first block.

While the method mentioned above is disclosed, a controller of a memory device is further provided, where the controller is utilized for accessing a Flash memory comprising a plurality of blocks. The controller comprises: a read only memory (ROM) arranged to store a program code; and a microprocessor arranged to execute the program code to control the access to the Flash memory. The controller that executes the program code by utilizing the microprocessor selectively programs a page in a first block of the blocks. When a status of the Flash memory is abnormal, the controller that executes the program code by utilizing the microprocessor determines whether a number of error bits is less than a predetermined value. In addition, when the number of error bits is not less than the predetermined value, the controller that executes the program code by utilizing the microprocessor moves the first block.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
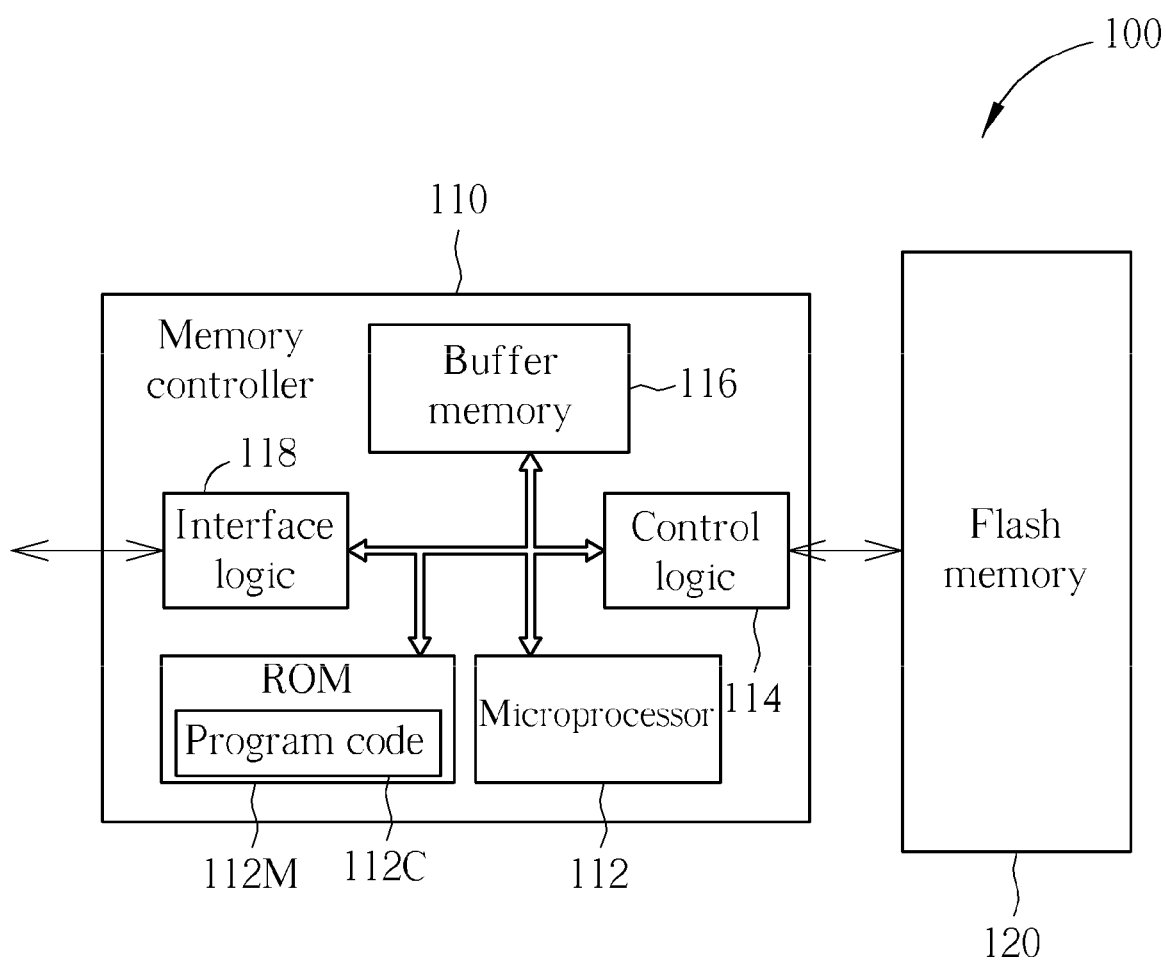
FIG. 1 is a diagram of a memory device according to a first embodiment of the present invention.

Please refer to FIG. 1, which illustrates a diagram of a memory device 100 according to a first embodiment of the present invention. In particular, the memory device 100 of this embodiment is a portable memory device, such as a memory card complying with SD/MMC, CF, MS, or XD standards. The memory device 100 comprises a Flash memory 120, and further comprises a controller arranged to access the Flash memory 120, where the aforementioned controller of this embodiment is a memory controller 110. According to this embodiment, the memory controller 110 comprises a microprocessor 112, a read only memory (ROM) 112M, a control logic 114, a buffer memory 116, and an interface logic 118.

The ROM 112M is arranged to store a program code 112C, and the microprocessor 112 is arranged to execute the program code 112C to control the access to the Flash memory 120.

Typically, the Flash memory 120 comprises a plurality of blocks, and the controller (e.g. the memory controller 110 that executes the program code 112C by utilizing the microprocessor 112) performs data erasure operations on the Flash memory 120 by erasing in units of blocks. In addition, a block can be utilized for recording a specific amount of pages, where the controller (e.g. the memory controller 110 that executes the program code 112C by utilizing the microprocessor 112) performs data writing operations on the Flash memory 120 by writing/programming in units of pages.

In practice, the memory controller 110 that executes the program code 112C by utilizing the microprocessor 112 is capable of performing various control operations by utilizing the internal components within the memory controller 110. For example, the memory controller 110 utilizes the control logic 114 to control access to the Flash memory 120 (e.g. operations of accessing at least one block or at least one page), utilizes the buffer memory 116 to perform buffering operations for the memory controller 110, and utilizes the interface logic 118 to communicate with a host device.

According to this embodiment, the controller (more particularly, the memory controller 110 that executes the program code 112C by utilizing the microprocessor 112) is capable of selectively programming a page in a first block of the blocks. The memory controller 110 that executes the program code 112C by utilizing the microprocessor 112 reads a status register (not shown) of the Flash memory 120 to determine whether a status of the Flash memory 120 is abnormal. When the status of the Flash memory is abnormal, the memory controller 110 determines whether a number of error bits is less than a predetermined value. Please note that the predetermined value corresponds to specifications of the Flash memory 120. For example, the program code 112C utilizes a look-up table (LUT) to provide the memory controller 110 with predetermined values respectively corresponding to different brands/models of Flash memories in advance, and the memory controller 110 can obtain the aforementioned predetermined value by performing table lookup in accordance with the brand/model of the Flash memory 120.

In practice, when the status of the Flash memory 120 is abnormal, the controller (e.g. the memory controller 110 that executes the program code 112C by utilizing the microprocessor 112) reads an error bit count from an error correction code (ECC) register (not shown) within the controller to determine whether the number of error bits is less than the predetermined value, where the error bit count represents the number of error bits. As a result, when the number of error bits is not less than the predetermined value, the memory controller 110 moves the first block.

In contrast to the related art, as the memory controller 110 of this embodiment operates in a prophylactic manner before it is too late to move the first block, the present invention can prevent user data from being lost in a situation where the quality of the Flash memory 120 degrades due to long-term use.

It is another advantage of the present invention that, as the memory controller 110 of this embodiment operates in a prophylactic manner before it is too late to move the first block, the present invention can maintain the performance of data access in a situation where the quality of the Flash memory 120 degrades due to long-term use. As a result, the present invention can prevent re-accessing data due to data errors.

It is another advantage of the present invention that, the present invention can prevent making a misjudgement regarding bad blocks. According to the related art, a good block of a portable memory device can be marked as a bad block when it is too late to correct errors thereof. The lifetime of the portable memory device will be unreasonably shortened when the number of bad blocks in this portable memory device increases in this manner. The present invention can prevent this situation, and will not waste any good block. Therefore, the present invention can effectively reduce the number of bad blocks, and further extend the lifetime of portable memory devices. Please refer to FIG. 2 for further detailed descriptions.

Figure 2:
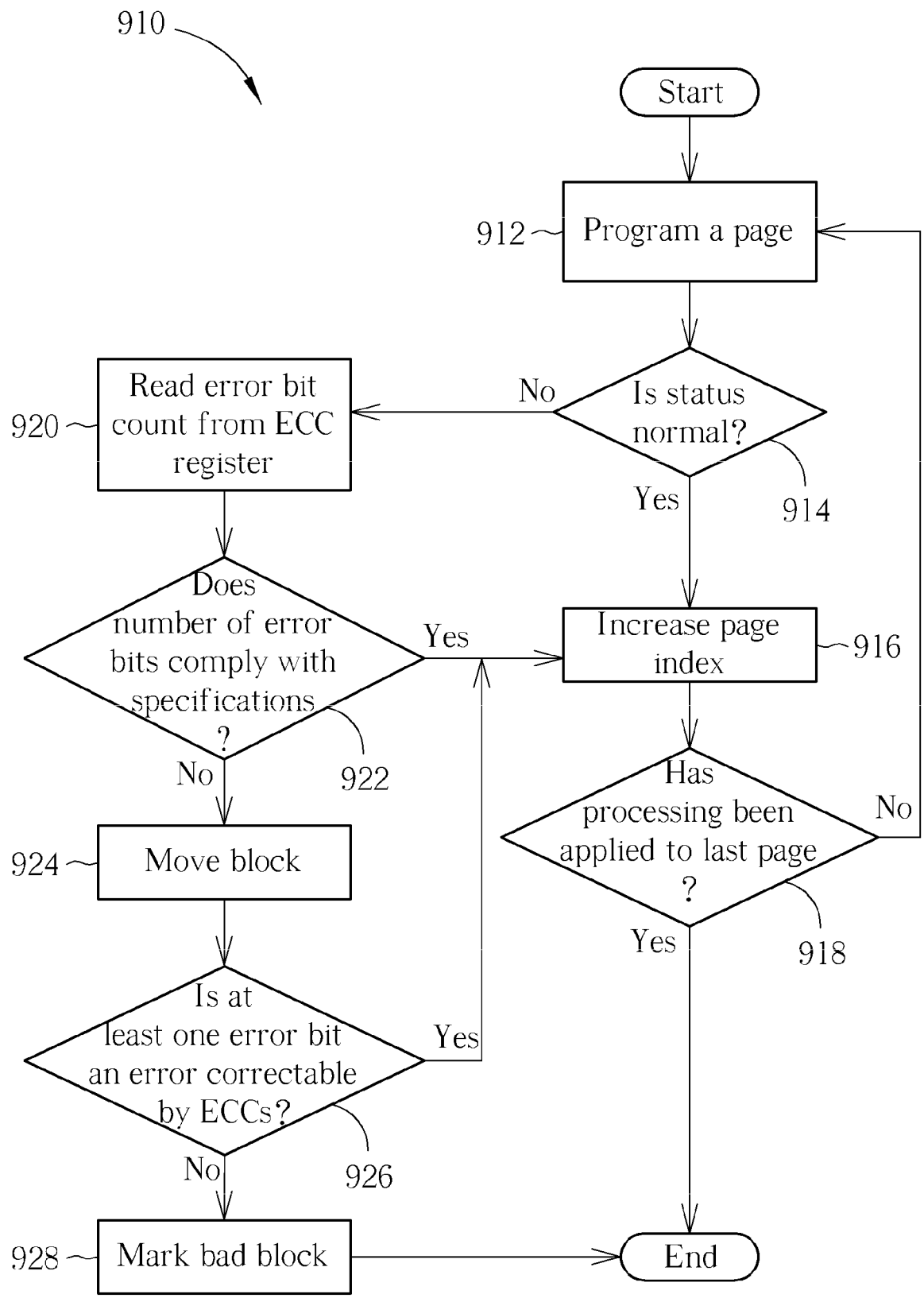
FIG. 2 is a flowchart of a control procedure of a method for accessing a Flash memory according to one embodiment of the present invention.

FIG. 2 is a flowchart of a control procedure 910 of a method for accessing a Flash memory according to one embodiment of the present invention. The method can be applied to the memory device 100 shown in FIG. 1, and more particularly, to the controller mentioned above (e.g. the memory controller 110 that executes the program code 112C by utilizing the microprocessor 112). In addition, the method can be implemented by utilizing the memory device 100 shown in FIG. 1, and more particularly, by utilizing the controller mentioned above (e.g. the memory controller 110 that executes the program code 112C by utilizing the microprocessor 112). The control procedure 910 of the method is described as follows.

In Step 912, the aforementioned controller (e.g. the memory controller 110 that executes the program code 112C by utilizing the microprocessor 112) programs (or writes) a page. More particularly, the controller programs a page in the first block of the blocks.

In Step 914, the controller checks whether the status of the Flash memory 120 is normal. More particularly, as mentioned, the memory controller 110 reads the status register (not shown) of the Flash memory 120 to determine whether the status of the Flash memory 120 is abnormal. When the status of the Flash memory 120 is normal, Step 916 is entered; otherwise (i.e. the status of the Flash memory 120 is abnormal, which means the operation of programming/writing the page in Step 912 is considered unsuccessful), Step 920 is entered.

In Step 916, the controller increases a page index. For example, the page index is defined as "Page", and the operation of increasing the page index in this step can be written as "Page++".

In Step 918, the controller determines whether the processing has been applied to the last page. More particularly, the controller determines whether the processing has been applied to the last page by checking the page index. When it is determined that the processing has been applied to the last page, the control procedure 910 is ended; otherwise, Step 912 is re-entered to program (or write) the next page.

In Step 920, the controller reads an error bit count from the ECC register mentioned above. For example, the error bit count represents the number of error bits in the latest written data.

In Step 922, the controller determines whether the number of error bits complies with the specifications of the Flash memory 120. According to this embodiment, the controller compares the error bit count read from the ECC register with the predetermined value mentioned above, in order to determine whether the number of error bits is less than the predetermined value. Thus, in response to the situation where the operation of programming/writing the page in Step 912 is considered unsuccessful, the controller dynamically determines whether to operate in a prophylactic manner before it is too late to move the first block. When the number of error bits is less than the predetermined value, Step 916 is entered; otherwise, Step 924 is entered.

In Step 924, the controller moves the first block. More particularly, the controller moves the first block before it is too late to do so. As a result, in response to the situation where the operation of programming/writing the page in Step 912 is considered unsuccessful, the controller operates in a prophylactic manner according to the determination of Step 922.

In Step 926, the controller determines whether at least one error bit is an error correctable by ECCs. According to this embodiment, the controller determines whether the at least one error bit of the latest written data (e.g. one or more error bits) is an error correctable by ECCs. More particularly, the controller determines whether the at least one error bit (e.g. one or more error bits) can be corrected by an ECC engine (not shown in FIG. 1) within the controller. When the controller determines that the at least one error bit is an error correctable by ECCs, Step 916 is entered; otherwise (i.e. the controller determines that the at least one error bit is not an error correctable by ECCs, which means the at least one error bit cannot be corrected by the ECC engine), Step 928 is entered.

In Step 928, the controller marks a bad block. More particularly, the controller marks the first block as a bad block.

According to this embodiment, as Step 924 allows the controller to operate in a prophylactic manner, the controller can properly protect user data by immediately moving the first block, rather than waiting for the determination of Step 926. As a result, the present invention can prevent unrecoverable errors in time to achieve the best performance available.

Figure 3:
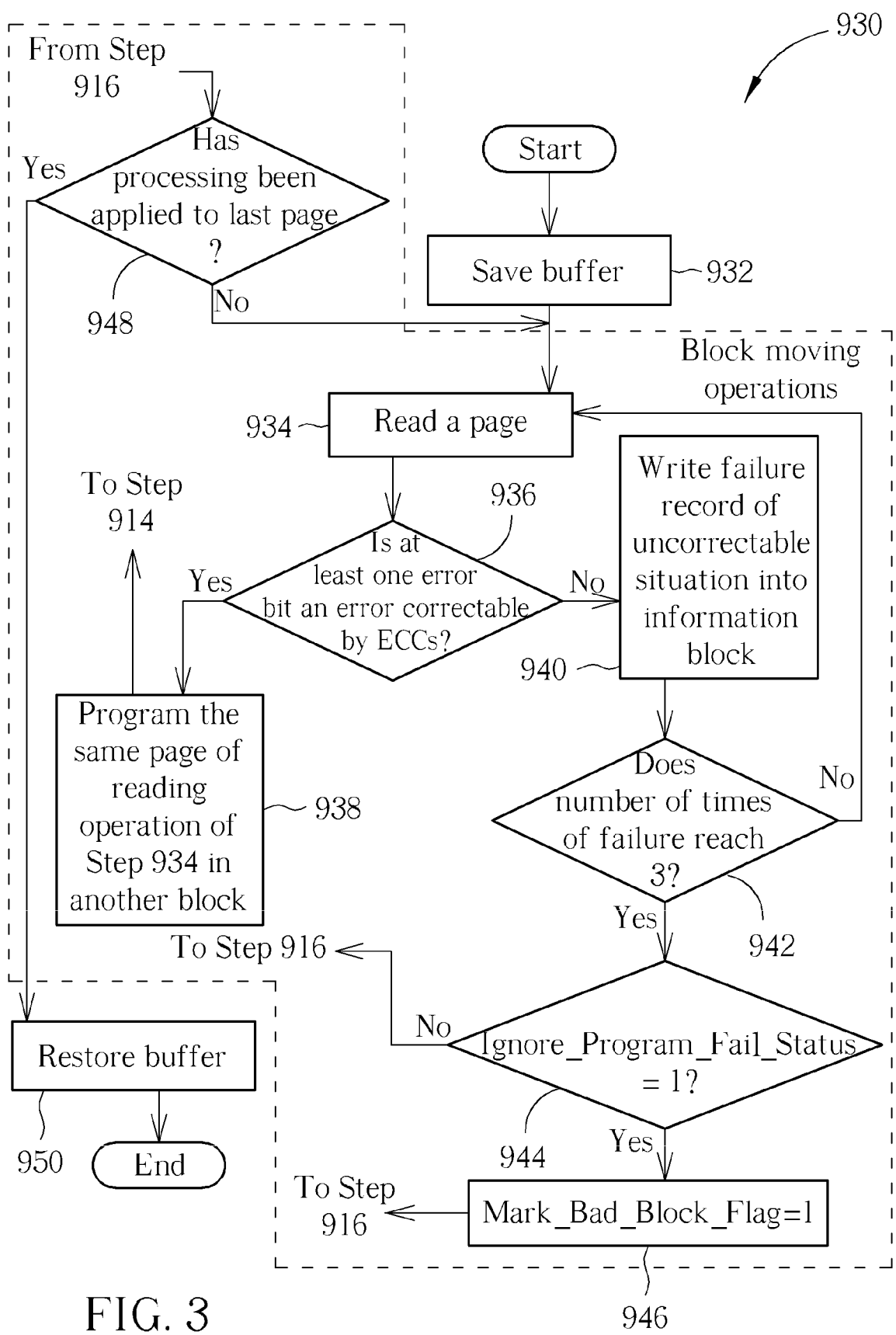
FIG. 3 is a diagram illustrating a variation of the embodiment shown in FIG. 2.

FIG. 3 is a diagram illustrating a variation of the embodiment shown in FIG. 2. The control procedure 930 relates to block moving operations, and utilizes at least a portion of the steps of the control procedure 910. More specifically, the control procedure 930 of this variation utilizes associated writing control of the control procedure 910 to perform the block moving operations.

According to this variation, the controller mentioned above (e.g. the memory controller 110 that executes the program code 112C by utilizing the microprocessor 112) first reads a page in a block of the blocks (e.g. a second block, which represents a source block for the block moving operations), and determines whether at least one error bit that occurs during reading is an error correctable by ECCs. Then, when the at least one error bit that occurs during reading is an error correctable by ECCs, the controller programs (or writes) the same page of the reading operation in another block of the blocks (e.g. the first block, which represents a target block for the block moving operations). Thus, in this variation, Step 912 of the control procedure 910 is changed to be selectively executed, and more particularly, is replaced by Step 938 of the control procedure 930. The control procedure 930 of the method is described as follows.

In Step 932, the controller (e.g. the memory controller 110 that executes the program code 112C by utilizing the microprocessor 112) saves the buffer. In this variation, the controller saves data of the buffer memory 116 into the Flash memory 120, in order to provide the block moving operations shown in FIG. 3 with the storage space of the buffer memory 116.

In Step 934, the controller reads a page. More particularly, in the block moving operations shown in FIG. 3, the controller first reads a page in a certain block of the blocks (e.g. the second block).

In Step 936, the controller determines whether at least one error bit that occurs during reading is an error correctable by ECCs. According to this variation, the controller determines whether at least one error bit of the latest read data (e.g. one or more error bits) is an error correctable by ECCs. More particularly, the controller determines whether the at least one error bit that occurs during reading (e.g. one or more error bits) can be corrected by the ECC engine within the controller. When the controller determines that the at least one error bit that occurs during reading is an error correctable by ECCs, Step 938 is entered; otherwise (i.e. the controller determines that the at least one error bit that occurs during reading is not an error correctable by ECCs, which means the at least one error bit cannot be corrected by the ECC engine), Step 940 is entered.

In Step 938, the controller programs (or writes) the same page of the reading operation of Step 934 in another block of the blocks (e.g. the first block). After Step 938 is completed, Step 914 is entered. Then, the controller operates according to the control procedure 910 until Step 916 is entered. As long as Step 916 is completed, Step 948 is entered.

In Step 940, the controller writes a failure record of the uncorrectable situation (i.e. the situation where the at least one error bit that occurs during reading is not an error correctable by ECCs) into an information block, where the information block is a block of the Flash memory 120, and is utilized for storing associated information of access control. More specifically, the controller records the physical address of a failure block in the information block.

In Step 942, the controller determines whether the number of times of failure reaches 3. More particularly, the controller determines whether the number of times of unsuccessfully reading the same page reaches 3 according to the failure record stored in the information block. By the determination of Step 942, the controller can selectively re-reads the page when the at least one error bit that occurs during reading (i.e. the reading operation of Step 934) is not an error correctable by ECCs. For example, when the number of times of unsuccessfully reading the same page reaches 3, Step 944 is entered; otherwise, Step 934 is re-entered to re-read the page.

According to this embodiment, the controller utilizes 3 as a threshold value for the determination of Step 942. This is for illustrative purposes only, and is not meant to be a limitation of the present invention. According to an embodiment of the present invention (e.g. another variation of the embodiment shown in FIG. 2), the threshold value can be a positive integer. These kinds of variations are all within the scope of the present invention.

In Step 944, the controller determines whether a flag Ignore_Program_Fail_Status is equal to 1. When Ignore_Program_Fail_Status=1, Step 946 is entered; otherwise, Step 916 is entered to increase the page index, where as long as Step 916 is completed, Step 948 is entered.

In Step 946, the controller sets a flag Mark_Bad_Block_Flag to be 1 (i.e. Mark_Bad_Block_Flag=1), in order to mark the certain block (e.g. the second block) as a bad block. As long as Step 946 is completed, Step 916 is entered to increase the page index, where as long as Step 916 is completed, Step 948 is entered.

In Step 948, the controller determines whether the processing has been applied to the last page. More particularly, the controller determines whether the processing has been applied to the last page by checking the page index. Please note that Step 948 of the control procedure 930 is substantially equivalent to Step 918 of the control procedure 910, however, the next step of Step 948 is directed to the control procedure 930 (i.e. the next step of Step 948 is within the control procedure 930). For example, in Step 948, when it is determined that the processing has been applied to the last page, Step 950 is entered; otherwise, Step 934 is re-entered to read the next page.

In Step 950, the controller restores the buffer. In this variation, the controller restores the data that is saved into the Flash memory 120 in Step 932 back to the buffer memory 116.

According to the above descriptions, no matter whether the access control is performed according to the control procedure 910 or according to the control procedure 930, as Step 924 allows the controller to operate in a prophylactic manner, the controller can properly protect user data by immediately moving the first block, rather than waiting for the determination of Step 926. Therefore, the present invention can prevent continuous accumulation of the number of error bits due to subsequent read disturbance or some other reasons, and further prevent an unrecoverable situation due to the continuous accumulation of the number of error bits. As a result, the present invention can prevent unrecoverable errors in time to achieve the best performance available.

Those skilled in the art will readily observe that numerous modifications and alterations of the device and method may be made while retaining the teachings of the invention.

What is claimed is:

1. A method for accessing a Flash memory comprising a plurality of blocks, the method comprising:
    reading a page in a second block of the blocks;
    determining whether at least one error bit that occurs during reading is an error correctable by error correction codes (ECCs);
    when the at least one error bit that occurs during reading is not an error correctable by ECCs, selectively re-reading the page;
    selectively programming a page in a first block of the blocks, wherein the step of selectively programming the page in the first block of the blocks further comprises:
        when the at least one error bit that occurs during reading is an error correctable by ECCs, programming the same page of the reading step in the first block of the blocks;
    when a status of the Flash memory is abnormal, determining whether a number of error bits is less than a predetermined value;
    when the number of error bits is not less than the predetermined value, moving the first block; and
    after the first block is moved, determining whether at least one error bit is an error correctable by ECCs.

2. The method of claim 1, wherein the step of determining whether the number of error bits is less than the predetermined value further comprises:
    when the status of the Flash memory is abnormal, reading an error bit count from an ECC register to determine whether the number of error bits is less than the predetermined value, wherein the error bit count represents the number of error bits.

3. The method of claim 1, further comprising:
    reading a status register of the Flash memory to determine whether the status of the Flash memory is abnormal.

4. The method of claim 1, wherein the predetermined value corresponds to specifications of the Flash memory.

5. The method of claim 1, further comprising:
    when the at least one error bit is not an error correctable by ECCs, marking the first block as a bad block.

6. A memory device, comprising:
    a Flash memory comprising a plurality of blocks; and
    a controller for accessing the Flash memory, wherein the controller selectively programs a page in a first block of the blocks;
    wherein the controller reads a page in a second block of the blocks, and determines whether at least one error bit that occurs during reading is an error correctable by error correction codes (ECCs); when the at least one error bit that occurs during reading is not an error correctable by ECCs, the controller selectively re-reads the page; and when the at least one error bit that occurs during reading is an error correctable by ECCs, the controller programs the same page of the reading operation in the first block of the blocks;
    wherein when a status of the Flash memory is abnormal, the controller determines whether a number of error bits is less than a predetermined value; when the number of error bits is not less than the predetermined value, the controller moves the first block; and after the controller moves the first block, the controller determines whether at least one error bit is an error correctable by ECCs.

7. The memory device of claim 6, wherein when the status of the Flash memory is abnormal, the controller reads an error bit count from an ECC register within the controller to determine whether the number of error bits is less than the predetermined value; and the error bit count represents the number of error bits.

8. The memory device of claim 6, wherein the controller reads a status register of the Flash memory to determine whether the status of the Flash memory is abnormal.

9. The memory device of claim 6, wherein the predetermined value corresponds to specifications of the Flash memory.

10. The memory device of claim 6, wherein when the at least one error bit is not an error correctable by ECCs, the controller marks the first block as a bad block.

11. A controller of a memory device, the controller being utilized for accessing a Flash memory comprising a plurality of blocks, the controller comprising:
    a read only memory (ROM) arranged to store a program code; and
    a microprocessor arranged to execute the program code to control the access to the Flash memory;
    wherein the controller that executes the program code by utilizing the microprocessor selectively programs a page in a first block of the blocks; the controller that executes the program code by utilizing the microprocessor reads a page in a second block of the blocks, and determines whether at least one error bit that occurs during reading is an error correctable by error correction codes (ECCs); when the at least one error bit that occurs during reading is not an error correctable by ECCs, the controller that executes the program code by utilizing the microprocessor selectively re-reads the page; and when the at least one error bit that occurs during reading is an error correctable by ECCs, the controller that executes the program code by utilizing the microprocessor programs the same page of the reading operation in the first block of the blocks;
    wherein when a status of the Flash memory is abnormal, the controller that executes the program code by utilizing the microprocessor determines whether a number of error bits is less than a predetermined value; when the number of error bits is not less than the predetermined value, the controller that executes the program code by utilizing the microprocessor moves the first block; and after the controller that executes the program code by utilizing the microprocessor moves the first block, the controller determines whether at least one error bit is an error correctable by ECCs.

12. The controller of claim 11, wherein when the status of the Flash memory is abnormal, the controller that executes the program code by utilizing the microprocessor reads an error bit count from an ECC register within the controller to determine whether the number of error bits is less than the predetermined value; and the error bit count represents the number of error bits.

13. The controller of claim 11, wherein the controller that executes the program code by utilizing the microprocessor reads a status register of the Flash memory to determine whether the status of the Flash memory is abnormal.

14. The controller of claim 11, wherein the predetermined value corresponds to specifications of the Flash memory.

15. The controller of claim 11, wherein when the at least one error bit is not an error correctable by ECCs, the controller that executes the program code by utilizing the microprocessor marks the first block as a bad block.

* * * * *